Feb. 6, 1968 W. W. FENN ET AL 3,368,218
RANGE MEASURING PHASE INTERFEROMETER RADAR SYSTEM
Filed May 31, 1966
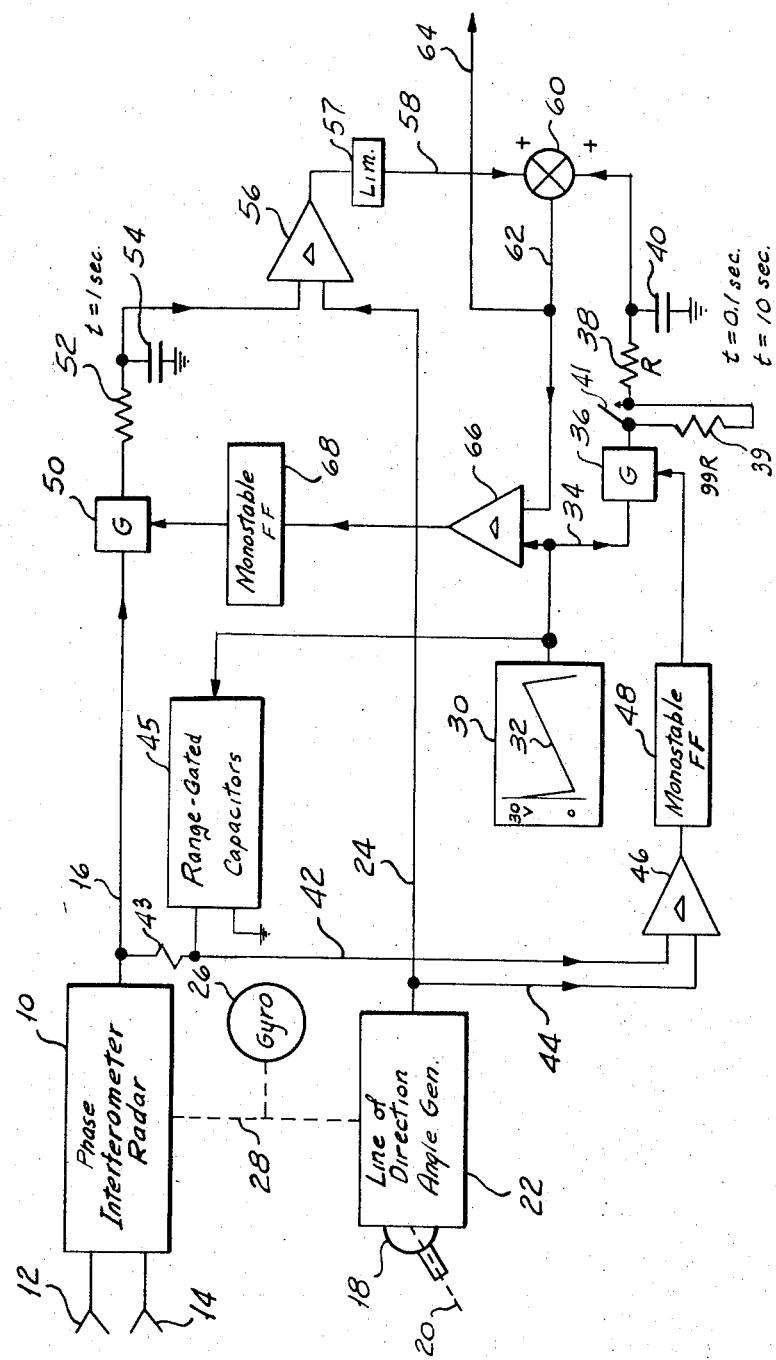
INVENTORS
William W. Fenn
Lester H. Kosowsky
BY
Shenier & O'Connor
ATTORNEYS з,368,218
RANGE MEASURING PHASE INTERFEROMETER RADAR SYSTEM
William W. Fenn, Old Greenwich, and Lester H. Kosowsky, Norwalk, Conn., assignors to United Aircraft Corporation, East Hartford, Conn., a corporation of Delaware
Filed May 31, 1966, Ser. No. 553,794
8 Claims. (Cl. 343—6)

ABSTRACT OF THE DISCLOSURE

A range measuring phase interferometer radar system in which a signal representing elevation angle of terrain along an azimuth line is sequentially coupled to a series of storage capacitors respectively to store the mean elevation angle of terrain within successive range increments. In response to the capacitors and to means providing an output in accordance with the elevation angle of an object along the azimuth line, there is produced an indication of range to the object.

---

Our invention relates to a phase interferometer radar system and more particularly to such a system which produces an accurate measure of range to a ground area.

There are known in the prior art phase interferometer systems which produce an output signal which is a function of elevation angle versus time. Such systems are, for example, used in installations wherein a picture of terrain is presented to the pilot of an aircraft or the like, to permit him to avoid obstacles or to select the best course to a destination considering both changes in altitude and course changes required by terrain. While these systems are satisfactory for their intended purpose of presenting a picture of terrain, they do not afford an accurate indication of range to a ground area.

We have invented a phase interferometer radar system which affords an indication of range to a ground area. Our system provides an accurate indication of range. It enhances the capability of a phase interferometer radar system. It is relatively simple in its construction and operation for the result achieved thereby.

One object of our invention is to provide a phase interferometer radar system which affords an indication of range to a ground area.

Another object of our invention is to provide an accurate indication of range to a ground area by use of a phase interferometer radar.

A further object of our invention is to enhance the capability of a phase interferometer radar.

Still another object of our invention is to provide a phase interferometer radar system providing a measure of range which is simple in its construction and operation.

Other and further objects of our invention will appear from the following description.

In general our invention comprises a phase interferometer radar system in which we compare the elevation angle signal produced by a phase interferometer radar with a signal generated in response to orientation of a line of direction generating device, such as an optical sight, directional radiation detector or the like, to the area under consideration. In response to the comparison, a range wave form signal is gated to a storage device to provide an approximate range value. From the phase interferometer radar signal we derive an average elevation angle signal and compare it with the optical device generated signal to provide a correcting signal for the approximate range signal. The resulting accurate range signal is compared with the range wave form signal to correct the average elevation angle signal.

In the accompanying drawing which forms part of the instant specification and which is to be read in conjunction therewith, the figure is a schematic view of one form of our phase interferometer radar system for measuring range.

Referring now to the drawing our system includes a phase interferometer radar 10 having vertically spaced receiving antennae 12 and 14 and adapted to be oriented in azimuth to a target area under consideration. As is known in the art there exists a phase difference in radiation received from a particular point by the spaced receiving antennae 12 and 14. This phase difference is a measure of the elevation angle of the point under consideration. The radar 10 provides an output signal on a channel 16 which signal is a measure of the variation of elevation angle with time for each transmitted pulse.

Our system also includes a direction finder such as an optical device 18 adapted to be oriented in elevation angle by any suitable means known to the art to direct its line of sight 20 to a particular target area. A generator 22 of any suitable type known to the art provides an output signal on a channel 24, which signal is a measure of the angle to which the device 18 is oriented. We provide our system with a gyroscopic stabilizing device 26 for stabilizing the radar 10 and the generator 22 as indicated by the broken line 28.

Our system includes an open loop arrangement for providing an approximate measure of range in response to the signals on channels 16 and 24. It includes a wave form generator 30 which produces a generally sawtooth wave form 32 which increases linearly with time. A channel 34 applies the signal from generator 30 to a signal input terminal of a gating circuit 36. We connect a filter comprising series connected resistors 39 and 38 and a storage capacitor 40. A switch 41 is adapted to be closed to shunt resistor 39. With switch 41 open the resistance value R of the resistor 38 is such that the filter has a time constant $t=0.1$ sec. Resistor 39 has a value of about 99R so that, with switch 41 closed the time constant is about 10 sec. A resistor 43 connects channel 16 to the common terminal of a range gated capacitor network 45 and a channel 42. As is known in the art the network 45 comprises a plurality of parallel branches, each including a capacitor and a normally nonconductive gate in series between the common terminal and ground. Means in the network responsive to the range wave form generator 30 sequentially renders the gates conductive to provide a staircase wave form of elevation angle versus time on channel 42. Channel 42 applies its signal and a channel 44 applies the signal on channel 24 to a differential amplifier 46, the output of which is applied to a monostable flip-flop circuit 48. We apply the output of the circuit 48 to the control input terminal of gating circuit 36.

As is known in the art, when the polarity of the input signal to flip-flop 48 changes, it produces an output pulse which triggers gate 36 to pass the signal from channel 34 to the filter including resistor 38 and capacitor 40. It will readily be appreciated from the arrangement thus far described that once during the time during which energy from a transmitted pulse is received, the signal on channel 42 will equal the signal on channel 44. That is, at that point the output of the amplifier 46 will pass through zero as the signal on channel 42 approaches and ultimately exceeds that on channel 44. At that time flip-flop 48 puts out a pulse to trigger gate 36 to pass the signal on channel 34 through resistor 38 or through resistors 38 and 39 to the storage capacitor 40. We so arrange our system that the signal 32 starts its rise with the transmission of a pulse by the radar 10 so that the signal on capacitor 40 affords an approximate measure of range to the point toward which device 18 is oriented.

It will be appreciated by those skilled in the art that the information contained in the signal on channel 16 scintillates as a function of time owing to the fact that it comes from a distributed area. The open loop system just described provides pulse-to-pulse integration which reduces the effect of the scintillation to provide an approximate range indication on capacitor 40.

We also provide a closed loop system for generating a correcting signal which is combined with the approximate signal stored on capacitor 40 to afford an accurate indication of range. We apply the signal on channel 16 to the signal input terminal of a gating circuit 50, the output of which is connected to a filter comprising a resistor 52 and a capacitor 54. As will be apparent from the following description, capacitor 54 stores an average value of elevation angle to the point under consideration. A differential amplifier 56 compares that average elevation angle signal with the optical sight angle generator signal on channel 24 to provide a correcting signal. A limiter 57, which applies the correcting signal to a channel 58, limits the effect of the correction to a signal corresponding to one interval between adjacent elevation angle steps in the signal on channel 42. A summing device 60 adds the correcting signal on channel 58 with the approximate value stored on capacitor 40 to provide an accurate range indication on a channel 62. This accurate signal may be carried to an indicating or utilizing device on a channel 64.

We apply both the signal on channel 62 and the signal output from wave form generator 30 to a differential amplifier 66 It will readily be apparent that once during each period between pulses, the range signal on channel 62 will equal the signal of wave form 32 so that the output of amplifier 66 passes through zero. We apply the output from amplifier 66 to a monostable flip-flop circuit 68. When as explained the output of amplifier 66 passes through zero, flip-flop 68 provides an output pulse to gate 50 to couple the elevation angle signal on channel 16 to the capacitor 54 to provide an average elevation angle signal at the point under consideration.

In operation of our phase interferometer radar system, the radar 10 provides a signal on channel 16 which is a measure of the variation of elevation angle with time over the period during which radiation reflected as a result of a transmitted pulse is received. When range to any point is desired, device 18 is oriented to direct its line of sight 20 toward the point under consideration. In response to that operation, channel 24 carries a signal indicating the angle to which the device is oriented. Channels 42 and 44 apply the radar elevation angle signal and the optical sight angle signal to amplifier 46.

We so select resistor 52 and capacitor 54 as to provide a time constant of about 1 second which is relatively short as compared with the time of 10 seconds of resistors 38 and 39 and capacitor 40 with switch 41 open and which is relatively short as compared with the time constant of 0.1 second of resistor 38 and capacitor 40 with switch 41 closed.

Initially we operate the system with switch 41 closed so that the system responds rapidly to provide the approximate range value. When that has been achieved switch 41 is opened to provide a slower response so that fluctuations resulting from the staircase wave form on channel 42 do not disturb the signal on channel 42. Opening of switch 41 may be accomplished manually or automatically as when the input and output of limiter 57 are equal, indicating that the input signal to limiter 57 is within limits. It will readily be understood that in normal operation of our system switch 41 is open and tracking basically is provided by the more rapidly responding loop including capacitor 54.

Once during each period between successive transmitted pulses, the signal on channel 42 equals that on channel 44 and the output of amplifier 46 passes through zero to cause flip-flop 48 to provide an output pulse to trigger gate 36 to couple the wave form generator signal on channel 34 to capacitor 40 to provide the approximate range signal. That approximate signal is combined in adder 60 with the correction signal on channel 58 to provide an accurate range signal on channel 62. Once in each period between successive transmitted pulses, wave form 32 equals the accurate range signal so that the output of amplifier 66 passes through zero to trigger flip-flop 68 to actuate gate 50 to pass the elevation angle signal on channel 16 to capacitor 54 to provide the average radar elevation angle signal to the point under consideration. That signal, in turn, is compared with the optical sight angle generator signal on channel 24 to provide a correcting signal on channel 58 which, as explained, is combined with the approximate signal on capacitor 40 to provide the accurate range signal.

It will be seen that we have accomplished the objects of our invention. We have provided a phase interferometer radar system which provides an indication of range. Our system affords an accurate range indication by use of a phase interferometer radar. It enhances the capability of a phase interferometer radar. It is simple in construction and in operation for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A radar system for providing an indication of the range to an object located along an azimuth line including in combination, a phase interferometer radar for providing a signal in accordance with the elevation angle of terrain along an azimuth line, a series of storage capacitors, means for sequentially coupling said signal to said capacitors to cause said capacitors respectively to store the mean elevation angle of terrain within successive range increments, means for providing an output in accordance with the elevation angle of an object along the azimuth line, and means responsive to the series of capacitors and to said output for providing an indication of the range to said object.

2. A system as in claim 1 in which said range indication producing means comprises means for generating a signal varying linearly with time.

3. A system as in claim 1 in which said range indication producing means comprises means for generating a signal varying linearly with time, first means responsive to said capacitors and to said output and to said linearly varying signal for providing an approximate range signal, means connecting said capacitors and said output and said linearly varying signal to said first means, second means responsive to said elevation angle signal and to said approximate range signal and to said linearly varying signal for correcting said approximate signal to an accurate range signal and means for applying said elevation angle signal and said approximate range signal and said linearly varying signal to said correcting means.

4. A system as in claim 3 in which said first means comprises a further storage capacitor, means for gating said linearly varying signal to said storage capacitor in response to equal inputs thereto and means connecting said capacitors and said output to said gating means.

5. A system as in claim 3 in which said second means comprises a further storage device, means for gating said elevation angle signal to said storage device in response to equal inputs and means for applying said accurate range signal and said linearly varying signal to said gating means.

6. A system as in claim 3 in which said first means is an open loop system and in which said second means is a closed loop system.

7. A system as in claim 3 in which said first means comprises a first further storage capacitor, means for gating said linearly varying signal to said first further storage capacitor in response to equal inputs, means for connecting said capacitors and said output to said first gating means to cause said first further storage capacitor to carry an approximate range signal, said second means comprising a second further storage capacitor, second means for gating said elevation angle signal to said second further storage device in response to equal inputs, and means for applying said accurate signal and said linearly varying signal to said second storage device to cause said second storage device to provide an average elevation angle signal.

8. A system as in claim 7 in which said second means includes means responsive to said average elevation angle signal and to said output for providing a correction signal, means for applying said average elevation angle signal and said output to said last named means and means for combining said correction signal and said approximate range signal to provide said accurate signal.

References Cited

UNITED STATES PATENTS

| | | | |
|---|---|---|---|
| 2,966,824 | 1/1961 | Granqvist | 343—11 X |
| 2,992,422 | 7/1961 | Hayes | 343—6 |
| 2,998,942 | 9/1961 | Kuck | 244—3.11 |
| 3,261,014 | 7/1966 | Diaz | 343—6 |
| 3,281,764 | 10/1966 | Tatom | 343—10 X |

RODNEY D. BENNETT, *Primary Examiner.*

M. F. HUBLER, *Assistant Examiner.*